United States Patent
Krishnappa et al.

(10) Patent No.: US 10,259,412 B1
(45) Date of Patent: Apr. 16, 2019

(54) BUMPER COLLISION SENSOR FOR AN AUTOMOTIVE VEHICLE

(71) Applicant: GM GLOBAL TECHNOLOGY OPERATIONS LLC, Detroit, MI (US)

(72) Inventors: Rajendra Prasad H. Krishnappa, Bangalore (IN); Andrew Dwoinen, Rochester Hills, MI (US)

( * ) Notice: Subject to any disclaimer, the term of this patent is extended or adjusted under 35 U.S.C. 154(b) by 19 days.

(21) Appl. No.: 15/835,504

(22) Filed: Dec. 8, 2017

(51) Int. Cl.
*B60R 19/48* (2006.01)
*B60R 19/18* (2006.01)
*B60R 19/02* (2006.01)

(52) U.S. Cl.
CPC .......... *B60R 19/483* (2013.01); *B60R 19/023* (2013.01); *B60R 19/18* (2013.01); *B60R 2019/1886* (2013.01)

(58) Field of Classification Search
CPC ..... B60R 19/483; B60R 19/023; B60R 19/18; B60R 2019/1886
See application file for complete search history.

(56) References Cited

U.S. PATENT DOCUMENTS

| | | | | |
|---|---|---|---|---|
| 6,988,754 B1* | 1/2006 | Watts | ...................... | B60R 19/20 293/107 |
| 9,067,553 B1* | 6/2015 | Ghannam | ........... | B60R 21/0136 |
| 9,663,053 B2* | 5/2017 | Saitoh | ...................... | B60R 19/18 |
| 2003/0085257 A1* | 5/2003 | James | ................... | B23K 20/122 228/112.1 |
| 2005/0116817 A1* | 6/2005 | Mattes | ................ | B60R 21/0136 340/436 |
| 2005/0155203 A1* | 7/2005 | Prevey | ...................... | B23P 9/02 29/90.01 |
| 2007/0090931 A1* | 4/2007 | Hawes | ................ | B60R 21/0136 340/436 |
| 2013/0079995 A1* | 3/2013 | Kula | ...................... | B60R 19/483 701/45 |
| 2015/0266438 A1* | 9/2015 | Ghannam | ............... | B60R 19/20 293/117 |
| 2015/0291122 A1* | 10/2015 | Seo | ........................ | B60R 10/483 701/45 |
| 2015/0367799 A1* | 12/2015 | Le | ........................ | B60R 21/0136 701/45 |
| 2017/0021790 A1* | 1/2017 | Young | .................. | B60R 21/0136 |
| 2017/0100300 A1* | 4/2017 | Rapp | ...................... | A41D 1/002 |

* cited by examiner

*Primary Examiner* — Lori L Lyjak

(57) ABSTRACT

An automotive vehicle includes a vehicle body having a width direction. A fascia with a long dimension oriented in the width direction is coupled to the vehicle body. A compressible layer is disposed between the fascia and the body, with a first face proximate the fascia and a second face proximate the body. The first face is provided with a first recess to define a first cavity between the fascia and the compressible layer. The second face is provided with a second recess to define a second cavity between the compressible layer and the body. The first recess and the second recess have long dimensions oriented in the width direction. A pressure sensor is disposed in the second cavity. The fascia has a fascia face proximate the compressible layer and a rib member projecting from the fascia face. The rib member is disposed at least partially in the first cavity.

14 Claims, 3 Drawing Sheets

BUMPER COLLISION SENSOR FOR AN AUTOMOTIVE VEHICLE

TECHNICAL FIELD

The present disclosure relates to automotive vehicles, and more particularly to bumper structures of automotive vehicles.

INTRODUCTION

In conventional automotive vehicles, a variety of protective devices may be implemented. One such protective device is a collision sensor. Collision sensors may be provided in various locations on the vehicle and be configured to detect an impact between the vehicle and an object external to the vehicle. Among the known types of collision sensors are accelerometer-based collision sensors, which detect a collision based on acceleration of the vehicle, and pressure-based collision sensors, which detect a collision based on an increased pressure applied to the sensor.

SUMMARY

An automotive vehicle according to the present disclosure includes a vehicle body having a width direction. A fascia with a long dimension oriented in the width direction is coupled to the vehicle body. A compressible layer is disposed between the fascia and the body. The compressible layer has a first face proximate the fascia and a second face proximate the body. The first face is provided with a first recess to define a first cavity between the fascia and the compressible layer. The second face is provided with a second recess to define a second cavity between the compressible layer and the body. The first recess and the second recess have long dimensions oriented in the width direction. A pressure sensor is disposed in the second cavity. The fascia has a fascia face proximate the compressible layer and a rib member projecting from the fascia face. The rib member is disposed at least partially in the first cavity.

In an exemplary embodiment, the rib member has a first end, a second end, and a central portion between the first end and the second end. At the first end the rib member projects a first distance from the fascia face, and at the central portion the rib member projects a second distance from the fascia face. The second distance being different from the first distance.

In an exemplary embodiment, the rib member includes a plurality of discontinuous segments, each coupled to the fascia face and extending from the fascia face.

In an exemplary embodiment, the first cavity is in fluid communication with the second cavity.

In an exemplary embodiment, the pressure sensor includes a pressure tube extending along the width direction.

A bumper assembly according to the present disclosure includes a fascia, a structural member spaced from the fascia, and a compressible layer disposed between the fascia and the structural member. The compressible layer has a first face proximate the fascia and a second face proximate the structural member. The first face is provided with a first recess to define a first cavity between the fascia and the compressible layer, and the second face is provided with a second recess to define a second cavity between the compressible layer and the structural member. A pressure sensor disposed in the cavity. The fascia has a fascia face proximate the compressible layer and a rib member projecting from the fascia face, with the rib member being disposed at least partially in the first cavity.

In an exemplary embodiment, the rib member has a first end, a second end, and a central portion between the first end and the second end. At the first end the rib member projects a first distance from the fascia face, and at the central portion the rib member projects a second distance from the fascia face. The second distance being different from the first distance.

In an exemplary embodiment, the rib member includes a plurality of discontinuous segments, each coupled to the fascia face and extending from the fascia face.

In an exemplary embodiment, the first cavity is in fluid communication with the second cavity.

In an exemplary embodiment, the pressure sensor includes a pressure tube.

A sensor assembly for an automotive vehicle according to the present disclosure includes a vehicle body and a bumper assembly coupled to the vehicle body. The bumper assembly includes a fascia and a compressible layer disposed between the fascia and the vehicle body. The compressible layer is provided with a first recess to define a first cavity between the compressible layer and the fascia, and with a second recess to define a second cavity between the compressible layer and the body. The fascia is provided with a fascia face and a rib member projecting from the fascia face. The rib member is disposed at least partially in the first cavity. A pressure sensor including a pressure tube is disposed at least partially in the second cavity.

In an exemplary embodiment, the rib member has a first end, a second end, and a central portion between the first end and the second end. At the first end the rib member projects a first distance from the fascia face, and at the central portion the rib member projects a second distance from the fascia face. The second distance being different from the first distance.

In an exemplary embodiment, the rib member includes a plurality of discontinuous segments, each coupled to the fascia face and extending from the fascia face.

In an exemplary embodiment, the first cavity is in fluid communication with the second cavity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desirable for particular applications or implementations.

Figure 1:
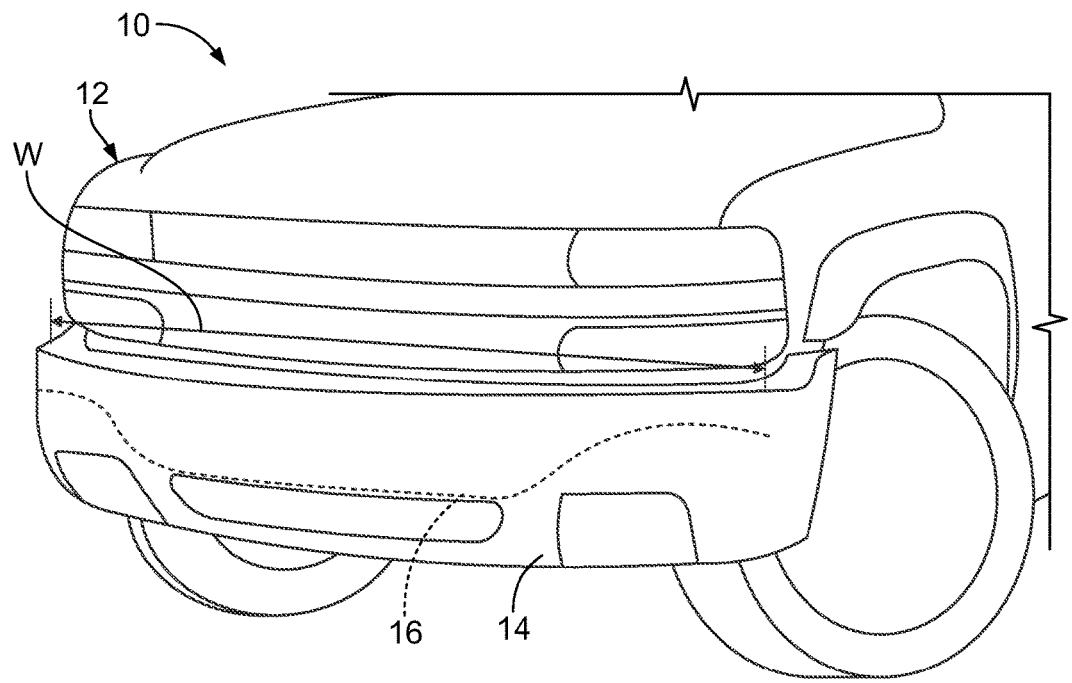
FIG. 1 is an illustrative view of an automotive vehicle according to an embodiment of the present disclosure.

Referring now to FIG. 1, an automotive vehicle 10 according to an embodiment of the present disclosure is illustrated. The vehicle 10 has a body 12. At least one bumper 14 is coupled to the body 12. A front bumper 14 is shown at a fore portion of the body 12 in FIG. 1, and a back bumper 14 may also be provided at an aft portion of the body 12. A pressure sensor assembly 16 is retained within the bumper 14, as will be discussed in further detail below. The pressure sensor assembly 16 is configured to generate a pressure signal based on pressure applied to the pressure sensor assembly 16.

In an exemplary embodiment, the pressure sensor assembly 16 includes a pressure tube extending generally along a width direction W of the vehicle 10. Such pressure tubes are compressible tubes formed of, for example, silicone, and filled with a fluid such as air. A pressure sensor is provided at one or both ends of the pressure tube and configured to measure pressure of the fluid within the tube. In response to compression of the tube, the pressure of the fluid increases, and the pressure sensor or sensors generate a signal indicative of the pressure increase.

The pressure sensor assembly 16 may be arranged generally linearly across the bumper 14, or in a non-linear profile as illustrated in FIG. 1. Advantageously, a non-linear profile may enable more responsive collision detection at different heights of the bumper 14.

Figure 2:
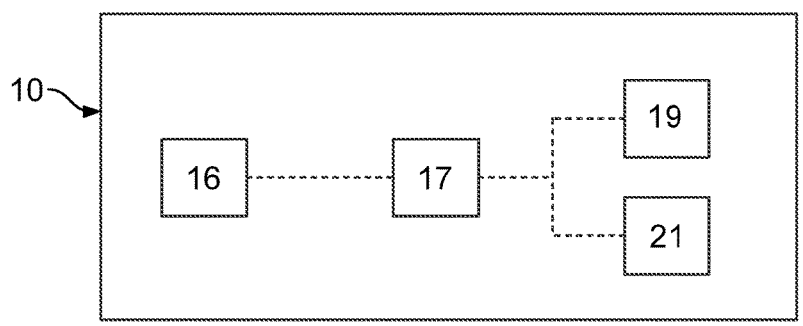
FIG. 2 is a schematic illustration of an automotive vehicle according to an embodiment of the present disclosure.

Referring now to FIG. 2, the vehicle 10 is schematically illustrated. The pressure sensor assembly 16 is in communication with at least one controller 17. While depicted as a single unit, the controller 17 may comprise multiple controller units collectively be referred to as a "controller." The controller 17 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The vehicle 10 additionally includes at least one protection system 19 and a wireless communication system 21. The protection system or systems 19 and the wireless communication system 21 are in communication with or under control of the controller 17. The protection system 19 includes one or more of a variety of systems for protecting occupants within the vehicle 10, pedestrians external to the vehicle 10, other objects external to the vehicle 10, or a combination thereof. As non-limiting examples, the protection system 19 may include an interior airbag or air curtain mounted to a steering wheel or interior panel of the vehicle, an exterior airbag mounted to an exterior portion of the vehicle for pedestrian protection, a seatbelt tensioning system, other protective device, or any combination thereof. The wireless communication system 21 is configured to communicate wirelessly with other vehicles or infrastructure and may include, for example, a cellular communication modem, a dedicated short-range communication (DSRC) modem, an IEEE 802.11 communication modem, other wireless communication device, or any combination thereof.

The controller 17 is programmed to, in response to a signal from the pressure sensor assembly 16 indicating that the vehicle 10 has collided with an object external to the vehicle 10, control the protection system 19 to activate for protection of occupants and/or pedestrians or objects in the vicinity of the vehicle 10. The controller 17 may be programmed to transmit a collision alert via the wireless communication system 21. Such alerts may indicate to other vehicles, emergency response personnel, or other entities that a collision has occurred. In some alternative embodiments, no wireless communication system is provided.

Figure 3:
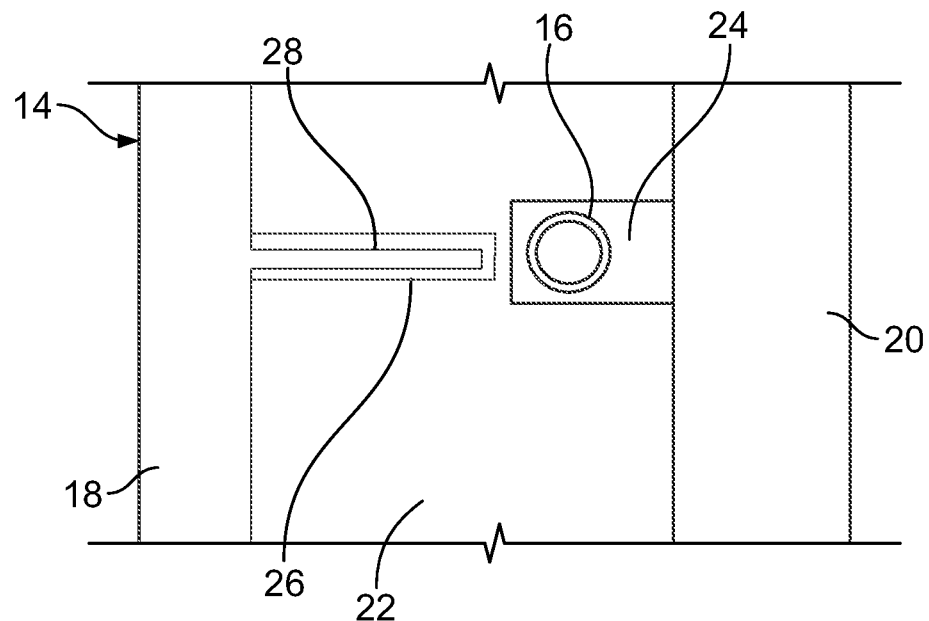
FIG. 3 is a cross-sectional view of a bumper assembly according to a first embodiment of the present disclosure.

Referring now to FIG. 3, a cross-section of the bumper 14 is illustrated schematically. The bumper 14 includes a fascia 18. The fascia 18 is generally rigid and may form the exterior of the bumper 14. The bumper 14 is secured to a structural member 20 of the body 12. The structural member 20 may include a body beam, tie bar, or any other suitable attachment feature of the body 12.

A compressible layer 22 is provided between the fascia 18 and the structural member 20. The compressible layer 22 is configured to deform or compress during a collision and may include, for example, a foam material or plastic honeycombed structure. The compressible layer 22 may thereby absorb energy during a collision. In some embodiments within the scope of the present disclosure, a rigid backer plate may be provided between the compressible layer 22 and the structural member 20.

A first groove is formed in the face of the compressible layer 22 adjacent to the structural member 20. A first cavity 24 is thereby defined between the compressible layer 22 and the structural member 20. At least a portion of the pressure sensor assembly 16 is disposed in the first cavity 24. In the illustrated embodiment, a pressure tube of the pressure sensor assembly 16 is disposed in the first cavity 24; however, in embodiments implementing other types of pressure sensors, other portions of the pressure sensor assembly 16 may be disposed in the first cavity 24. Furthermore, while the pressure tube is illustrated as being round in cross-section, in other embodiments the pressure tube may take alternate shapes.

A second groove is formed in the face of the compressible layer 22 adjacent to the fascia 18. A second cavity 26 is thereby defined between the compressible layer 22 and the fascia 18.

A rib member or flange 28 projects from the face of the fascia 18 adjacent to the compressible layer 22. The rib member 28 is disposed at least partially within the second cavity 26.

In the case of a collision between the bumper 14 and an object external to the vehicle 10, the fascia 18 may impart pressure to the compressible layer 22. The compressible layer 22 will compress under the pressure, at least partially collapsing the first cavity 24 and the second cavity 26. The rib member 28 may thereby drive into the compressible layer 22 between the first cavity 24 and the second cavity 26, which in turn contacts the portion of the pressure sensor assembly 16. The pressure sensor assembly 16 may then generate a signal indicative of the pressure increase, in response to which the controller 17 may determine that the collision has occurred.

As may be seen, the rib member 28 provides a reaction surface for the pressure sensor assembly 16, which may increase the responsiveness of the pressure sensor assembly 16 relative to known solutions. Moreover, the shape and profile of the rib member 28 may be tuned to provide desired response characteristics for a given application. Furthermore, the fascia 18 may extend outboard of the structural member 20, thereby increasing width of the reaction surface.

Figure 4:
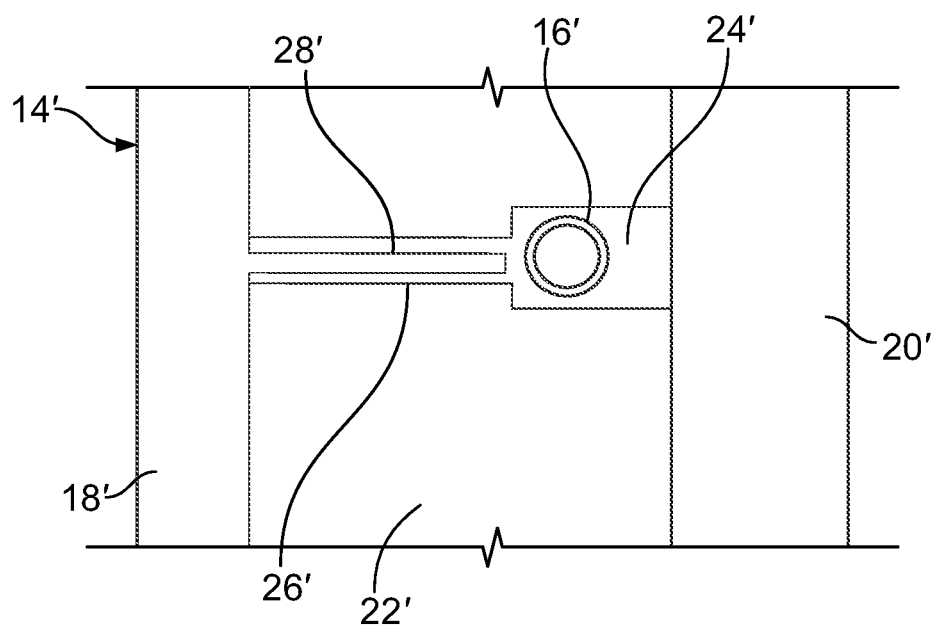
FIG. 4 is a cross-sectional view of a bumper assembly according to a second embodiment of the present disclosure.

Referring now to FIG. 4, a cross-section of an alternate embodiment of a bumper 14' is illustrated schematically. The bumper 14' includes a fascia 18' and is secured to a structural member 20' in a generally similar manner as discussed above with respect to FIG. 3. A compressible layer 22' is provided between the fascia 18' and the structural member 20'. A first groove is formed in the face of the compressible layer 22' adjacent to the structural member 20' to define a first cavity 24'. At least a portion of the pressure sensor assembly 16' is disposed in the first cavity 24'. A second groove is formed in the face of the compressible layer 22' adjacent to the fascia 18'. A second cavity 26' is thereby defined between the compressible layer 22' and the fascia 18'. The second cavity 26' extends to the first cavity 24'. A rib member or flange 28' projects from the face of the fascia 18' adjacent to the compressible layer 22'. The rib member 28' is disposed at least partially within the second cavity 26.

In the case of a collision between the bumper 14 and an object external to the vehicle 10, the fascia 18 may impart pressure to the compressible layer 22. The compressible layer 22 will compress under the pressure, at least partially collapsing the first cavity 24 and the second cavity 26 and driving the rib member 28 into contact with the portion of the pressure sensor assembly 16. The pressure sensor assembly 16 may then generate a signal indicative of the pressure increase, in response to which the controller 17 may determine that the collision has occurred.

Figure 5A:
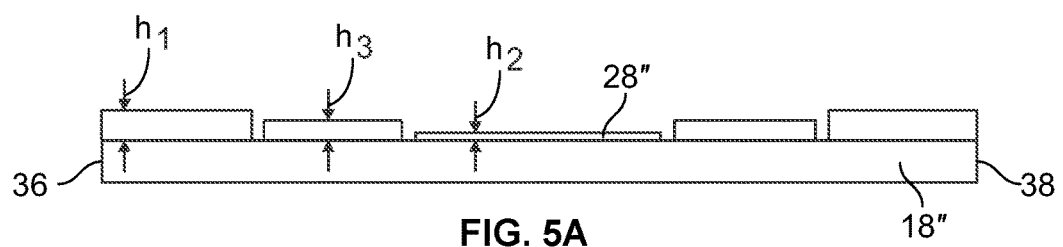
FIGS. 5A-5C are cross-sectional views of bumper assemblies according to various embodiments of the present disclosure.
Figure 5B:
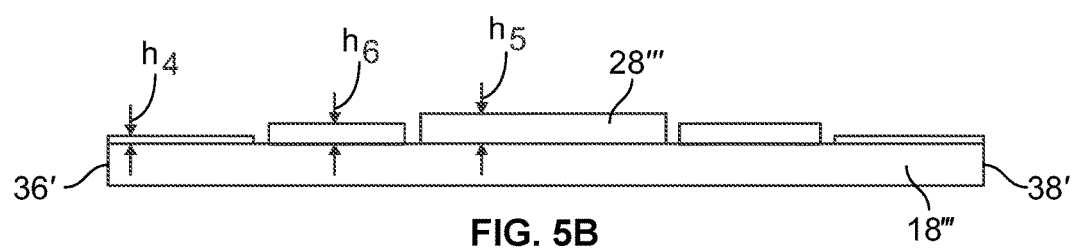
Figure 5C:
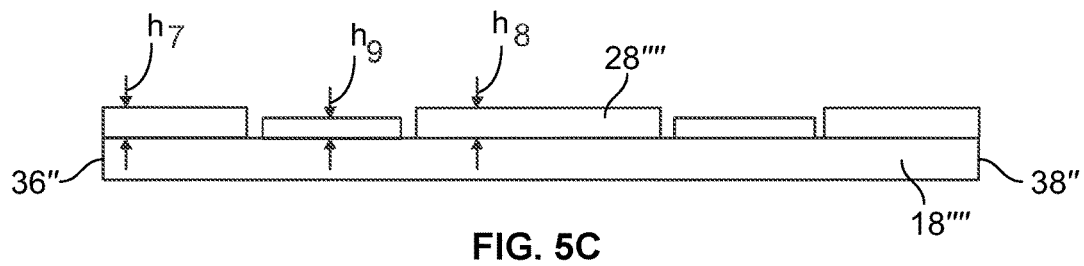

As illustrated in FIGS. 5A, 5B, and 5C, the height and profile of the rib member may be tuned to provide desired response characteristics. As used here, the height refers to the distance from the fascia to which the rib member projects. Referring now to FIG. 5A, a first exemplary rib profile is illustrated. In this embodiment, the fascia 18'' is provided with a rib member 28'' having a first height $h_1$ at a first end 36, a second height $h_2$ at a central portion between the first end 36 and second end 38, and a third height $h_3$ between the first and second ends 36, 38 and the central portion. The third height $h_3$ is less than the first height $h_1$, and the second height $h_2$ is less than the third height $h_3$. The rib member 28'' thereby has a stepped height profile, with a greater height at the first and second ends 36, 38 than at the central portion. Such a rib profile may increase response of the pressure sensor assembly proximate the first and second ends 36, 38. This may advantageously offset attenuation in pressure response near edges of the bumper caused by energy loss due to deflection.

Referring now to FIG. 5B, a second exemplary rib profile is illustrated. In this embodiment, the fascia 18''' is provided with a rib member 28''' having a fourth height $h_4$ at a first end 36', a fifth height $h_5$ at a central portion between the first end 36' and second end 38', and a sixth height $h_6$ between the first and second ends 36', 38' and the central portion. The fourth height $h_4$ is less than the sixth height $h_6$, and the sixth height $h_6$ is less than the fifth height $h_5$. The rib member 28''' thereby has a stepped height profile, with a lesser height at the first and second ends 36', 38' than at the central portion. Such a rib profile may increase response of the pressure sensor assembly proximate the central portion.

Referring now to FIG. 5C, a third exemplary rib profile is illustrated. In this embodiment, the backer plate 24'''' is provided with a rib member 28'''' having a seventh height $h_7$ at a first end 36'', an eighth height $h_8$ at a central portion between the first end 36'' and second end 38'', and a ninth height $h_9$ between the first and second ends 36'', 38'' and the central portion. The ninth height $h_9$ is less than the seventh height $h_7$ and the eighth height $h_8$. Such a rib profile may increase response of the pressure sensor assembly proximate the central portion and at first and second ends.

While FIGS. 5A through 5C illustrate rib profiles having five distinct segments of discontinuous heights spaced from one another, any number of segments may be used, the segments may be joined with no gap therebetween, and/or the height of the rib profile may vary continuously between adjacent segments.

As may be seen, the present disclosure provides a system for detecting a collision between a vehicle and an object external to the vehicle, and moreover does so while providing an easy mechanism for tuning the desired response of the collision sensor.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a vehicle body having a width direction;
a fascia coupled to the vehicle body, the fascia having a long dimension oriented in the width direction;
a compressible layer disposed between the fascia and the body, the compressible layer having a first face proximate the fascia and a second face proximate the body, the first face being provided with a first recess to define a first cavity between the fascia and the compressible layer, the second face being provided with a second recess to define a second cavity between the compressible layer and the body, the first recess and the second recess having long dimensions oriented in the width direction; and
a pressure sensor disposed in the second cavity;

wherein the fascia has a fascia face proximate the compressible layer and a rib member projecting from the fascia face, the rib member being disposed at least partially in the first cavity.

2. The automotive vehicle of claim 1, wherein the rib member has a first end, a second end, and a central portion between the first end and the second end, at the first end the rib member projects a first distance from the fascia face, and at the central portion the rib member projects a second distance from the fascia face, the second distance being different from the first distance.

3. The automotive vehicle of claim 1, wherein the rib member includes a plurality of discontinuous segments, each coupled to the fascia face and extending from the fascia face.

4. The automotive vehicle of claim 1, wherein the first cavity is in fluid communication with the second cavity.

5. The automotive vehicle of claim 1, wherein the pressure sensor includes a pressure tube extending along the width direction.

6. A bumper assembly comprising:
   a fascia;
   a structural member spaced from the fascia;
   a compressible layer disposed between the fascia and the structural member, the compressible layer having a first face proximate the fascia and a second face proximate the structural member, the first face being provided with a first recess to define a first cavity between the fascia and the compressible layer, the second face being provided with a second recess to define a second cavity between the compressible layer and the structural member; and
   a pressure sensor disposed in the cavity;
   wherein the fascia has a fascia face proximate the compressible layer and a rib member projecting from the fascia face, the rib member being disposed at least partially in the first cavity.

7. The bumper assembly of claim 6, wherein the rib member has a first end, a second end, and a central portion between the first end and the second end, at the first end the rib member projects a first distance from the fascia face, and at the central portion the rib member projects a second distance from the fascia face, the second distance being different from the first distance.

8. The bumper assembly of claim 6, wherein the rib member includes a plurality of discontinuous segments, each coupled to the fascia face and extending from the fascia face.

9. The bumper assembly of claim 6, wherein the first cavity is in fluid communication with the second cavity.

10. The bumper assembly of claim 6, wherein the pressure sensor includes a pressure tube.

11. A sensor assembly for an automotive vehicle, comprising:
    a vehicle body;
    a bumper assembly coupled to the vehicle body, the bumper assembly including a fascia and a compressible layer disposed between the fascia and the vehicle body, wherein the compressible layer is provided with a first recess to define a first cavity between the compressible layer and the fascia, wherein the compressible layer is provided with a second recess to define a second cavity between the compressible layer and the body, and wherein the fascia is provided with a fascia face and a rib member projecting from the fascia face, the rib member being disposed at least partially in the first cavity; and
    a pressure sensor comprising a pressure tube disposed at least partially in the second cavity.

12. The sensor assembly of claim 11, wherein the rib member has a first end, a second end, and a central portion between the first end and the second end, at the first end the rib member projects a first distance from the fascia face, and at the central portion the rib member projects a second distance from the fascia face, the second distance being different from the first distance.

13. The sensor assembly of claim 11, wherein the rib member includes a plurality of discontinuous segments, each coupled to the fascia face and extending from the fascia face.

14. The sensor assembly of claim 11, wherein the first cavity is in fluid communication with the second cavity.

\* \* \* \* \*